June 24, 1958 P. E. MASON 2,840,411
BUMPER CONSTRUCTION-ROLLAWAY BUMPER
Filed March 7, 1955
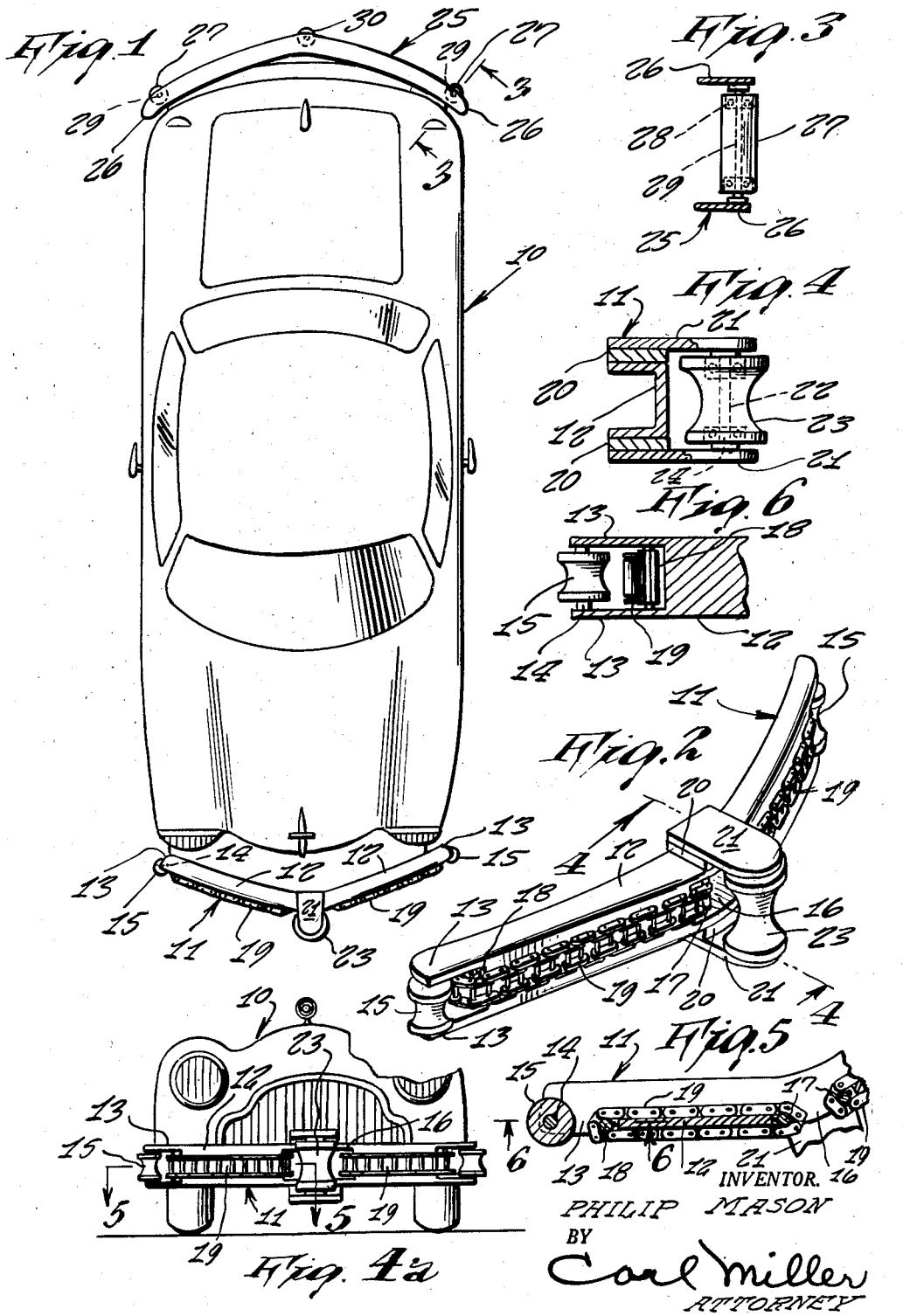
INVENTOR.
PHILIP MASON
BY
Carl Miller
ATTORNEY

United States Patent Office 2,840,411
Patented June 24, 1958

2,840,411

BUMPER CONSTRUCTION—ROLLAWAY BUMPER

Philip Edmond Mason, Brooklyn, N. Y.

Application March 7, 1955, Serial No. 492,643

1 Claim. (Cl. 293—72)

This invention relates to bumper constructions for automobiles or the like.

It is an object of the present invention to provide improved bumper construction which will prevent or minimize serious and costly accidents of the type ocurring when a plurality of cars pile up when the frontmost car makes a sudden stop and during head-on collisions.

It is another object of the present invention to provide an improved bumper construction wherein substantially V-shaped bumpers are provided having rollers at their apexes and ends so that when one bumper contacts the correspondingly shaped bumper of another car, the rollers will cause the cars to veer to one side relative to each other instead of the sudden stop and impact which frequently results in fatalities.

Other objects of the present invention are to provide an improved bumper construction bearing the above objects in mind which is of simple construction, inexpensive to manufacture, has a minimum number of parts, is efficient and effective in operation.

For other objects and a better understanding of the invention, reference may be had to the following detailed description taken in connection with the accompanying drawing, in which:

Figure 1 is a top plan view of an automobile embodying the features of the present invention and showing the invention in operative use thereon;

Fig. 2 is a perspective view shown alone of the front bumper forming a part of the invention;

Fig. 3 is a vertical sectional view taken along the line 3—3 of Fig. 1;

Fig. 4 is a vertical sectional view taken along the line 4—4 of Fig. 2;

Fig. 4a is a front elevational view of the car of Fig. 1;

Fig. 5 is a transverse sectional view taken along the line 5—5 of Fig. 4a; and

Fig. 6 is a vertical sectional view taken along the line 6—6 of Fig. 5.

Referring now more in detail to the drawing, 10 indicates generally an automobile at the front end of which is mounted a substantially V-shaped bumper indicated generally at 11.

The bumper 11 includes the channel-shaped body portion 12 of V-shaped configuration integrally formed at its opposite ends with the overhanging vertically spaced flanges 13. A pin 14 is mounted within each pair of vertically spaced flanges 13 and rotatably mounts thereon a small roller 15.

The central portion of the body portion 12 is provided with a rectangular opening 16 at each side of which are rotatably mounted the rollers 17. Corresponding rollers 18 are mounted intermediate the flanges 13 adjacent the outer ends of the body portion 12 and cooperate with their respective inner rollers 17 to mount the endless chains 19.

A spacer plate 20 (Fig. 4) is suitably secured above and below the opening 16 and mounts thereon the overhanging flanges 21 extending forwardly of the vehicle. A pin 22 is mounted between the flanges 21 and rotatably mounts thereon a larger roller 23 by means of the ball bearing assemblies 24.

A rear V-shaped bumper indicated generally at 25 is suitably secured to the rear end of the car 10 and is integrally formed with the overhanging end flanges 26 between which are rotatably mounted the rollers 27 by means of the ball bearing assemblies 28 and pins 29 (Fig. 3). The bumper 25 is provided with a central opening within which is rotatably mounted a roller 30 in a manner similar to the rollers 27.

When the bumper 11 of the car 10 contacts the corresponding bumper 25 of another car, the chains 19, and rollers 23, 15, 27 and 30 will cause the cars to swerve laterally relative to each other to avoid the sudden stop and impact which results in fatalities. This lateral swerving will be occasioned by the rotational movement of the rollers as well as the endless chain 19.

While various changes may be made in the detail construction, it shall be understood that such changes shall be within the spirit and scope of the present invention as defined by the appended claim.

Having thus set forth and disclosed the nature of my invention, what is claimed is:

A rollaway bumper for an automotive vehicle, including a V-shaped channel member disposed with the apex thereof extending forwardly while the hollow interior of the channel member facing rearwardly, a pair of horizontal lateral end lugs or flanges spaced vertically apart at each end of the channel member and projecting integrally therefrom, an end roller and an inner roller operatively located between each pair of end flanges for rotation about vertical axes, a pair of forwardly projecting horizontal flanges secured upon the channel member at the apex thereof, a single roller relatively larger than the end rollers rotatably mounted between the latter two flanges, a further inner pair of rollers mounted in the channel member within the apex thereof and spaced a short distance apart, said channel member at said apex having a central opening, and a distinct endless chain mounted upon the inner roller at each end and the inner roller more adjacent of the further inner pair as well as about the web of said channel member upon each of the two branches of said V-shaped channel member.

References Cited in the file of this patent

UNITED STATES PATENTS

| | | |
|---|---|---|
| 1,616,455 | Loughridge | Feb. 8, 1927 |
| 1,665,085 | Cunningham | Apr. 3, 1928 |
| 2,069,282 | Silverman | Feb. 2, 1937 |
| 2,077,110 | Johnson | Apr. 13, 1937 |